United States Patent
Thomas et al.

(10) Patent No.: US 11,157,614 B1
(45) Date of Patent: Oct. 26, 2021

(54) PREVENTION OF FALSE POSITIVE DETECTION OF MALWARE

(71) Applicant: Malwarebytes Inc., Santa Clara, CA (US)

(72) Inventors: Sunil Mathew Thomas, Palm Harbor, FL (US); Tina LaVonne Barfield, Pinellas Park, FL (US); Adam Hyder, Cupertino, CA (US)

(73) Assignee: Malwarebytes Inc., Santa Clara, CA (US)

( * ) Notice: Subject to any disclaimer, the term of this patent is extended or adjusted under 35 U.S.C. 154(b) by 0 days.

(21) Appl. No.: 17/160,310

(22) Filed: Jan. 27, 2021

(51) Int. Cl.
*G06F 21/00* (2013.01)
*G06F 21/56* (2013.01)

(52) U.S. Cl.
CPC ........ *G06F 21/56* (2013.01); *G06F 2221/033* (2013.01)

(58) Field of Classification Search
CPC ...... G06F 21/52; G06F 21/554; G06F 21/562; G06F 21/566; G06F 21/56; G06F 2221/033; G06F 21/552; G06K 9/6297; H04L 63/1433
See application file for complete search history.

(56) References Cited

U.S. PATENT DOCUMENTS

| | | | |
|---|---|---|---|
| 7,565,382 B1 * | 7/2009 | Sobel | G06F 21/57 |
| 9,219,707 B1 * | 12/2015 | Mesropian | H04L 63/1408 |
| 9,935,984 B1 * | 4/2018 | Castilho | G06F 21/57 |
| 9,996,694 B2 * | 6/2018 | Sethumadhavan | G06F 21/52 |
| 10,044,755 B2 * | 8/2018 | Pandya | H04L 41/0893 |
| 10,129,118 B1 * | 11/2018 | Ghare | H04L 43/028 |
| 10,250,623 B1 * | 4/2019 | Patton | H04L 63/1416 |
| 2008/0016564 A1 * | 1/2008 | Claudatos | G06F 21/568 726/22 |
| 2008/0229414 A1 * | 9/2008 | Hudis | H04L 63/20 726/22 |
| 2008/0229421 A1 * | 9/2008 | Hudis | H04L 63/1433 726/25 |
| 2008/0229422 A1 * | 9/2008 | Hudis | G06F 21/577 726/25 |
| 2009/0100518 A1 * | 4/2009 | Overcash | G06F 21/552 726/22 |
| 2009/0178144 A1 * | 7/2009 | Redlich | G06F 21/6209 726/27 |
| 2009/0217381 A1 * | 8/2009 | Helman | G06F 21/577 726/25 |

(Continued)

*Primary Examiner* — Don G Zhao
(74) *Attorney, Agent, or Firm* — Fenwick & West LLP

(57) ABSTRACT

A system manages the rate of false positive detections of malware by controlling release of malware definition updates. The system determines a cohort of target devices for distributing an initial release of an update of malware definitions and sends the update exclusively to the target devices. The system then obtains telemetry data which include information associated with usage of the target devices following the update. The system analyzes the telemetry data for instances of false positive detections of malware arising from the update to the malware definitions. Based on the analysis of the telemetry data, the system determines whether to further distribute the update outside of the cohort of target client devices or to roll back the update provided to the cohort. The system executes the decision to further distribute the update or to roll back the update.

17 Claims, 3 Drawing Sheets

(56) References Cited

U.S. PATENT DOCUMENTS

| | | | | |
|---|---|---|---|---|
| 2009/0328222 A1* | 12/2009 | Helman | ............... | G06F 21/554 726/25 |
| 2015/0172304 A1* | 6/2015 | Kleczynski | ......... | H04L 63/1416 726/23 |
| 2015/0317475 A1* | 11/2015 | Aguayo Gonzalez | .. | G06F 21/55 726/23 |
| 2015/0382209 A1* | 12/2015 | Sanneck | ............... | H04W 24/10 370/252 |
| 2016/0105449 A1* | 4/2016 | Montagnon | ........... | H04L 63/145 726/22 |
| 2017/0070521 A1* | 3/2017 | Bailey | ................... | G06F 21/316 |
| 2017/0286671 A1* | 10/2017 | Chari | .................... | G06F 21/552 |
| 2017/0331840 A1* | 11/2017 | Ranjan | ................ | H04L 63/1441 |
| 2018/0046811 A1* | 2/2018 | Andriani | ............ | H04L 63/1425 |
| 2019/0163900 A1* | 5/2019 | Zhang | ................... | G06F 21/567 |
| 2019/0190947 A1* | 6/2019 | Nsouli | ..................... | G06F 8/61 |
| 2019/0215688 A1* | 7/2019 | Zavesky | .............. | H04L 67/125 |
| 2020/0287793 A1* | 9/2020 | Buck | .................... | H04L 41/082 |
| 2021/0044579 A1* | 2/2021 | Nelson-Gal | ........... | H04L 41/046 |
| 2021/0133196 A1* | 5/2021 | Gladwin | .......... | G06F 16/24564 |

\* cited by examiner

PREVENTION OF FALSE POSITIVE DETECTION OF MALWARE

FIELD OF ART

The present disclosure generally relates to computer security and more specifically to prevention of false positive detection of malware.

BACKGROUND

A malware definition is a set of data that specifies characteristics or behaviors of malware. Because malware is constantly evolving, anti-malware applications receive frequent updates to malware definitions. If malware definitions are written too broadly, newly released malware definitions may erroneously classify trusted applications as malware. These false positive detections may result in trusted programs or files being quarantined or removed.

SUMMARY

A false positive analysis system prevents false positive detection of malware due to an update in malware definition by releasing the update in a controlled fashion. The false positive analysis system determines a cohort of target devices for distributing an initial release of an update of malware definitions and sends the update exclusively to the target devices. The false positive analysis system then obtains, from the target devices, telemetry data which include information associated with usage of the target devices following the update. The false positive analysis system analyzes the telemetry data for instances of false positive detections of malware arising from the update to the malware definitions. Based on the analysis of the telemetry data, the false positive analysis system determines whether to further distribute the update outside of the cohort of target client devices or to roll back the update provided to the cohort. The false positive analysis system executes the decision to further distribute the update or to roll back the update.

In another embodiment, a non-transitory computer-readable storage medium stores instructions that when executed by a processor causes the processor to execute the above-described method.

In yet another embodiment, a computer system includes a processor and a non-transitory computer-readable storage medium that stores instructions for executing the above-described method.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
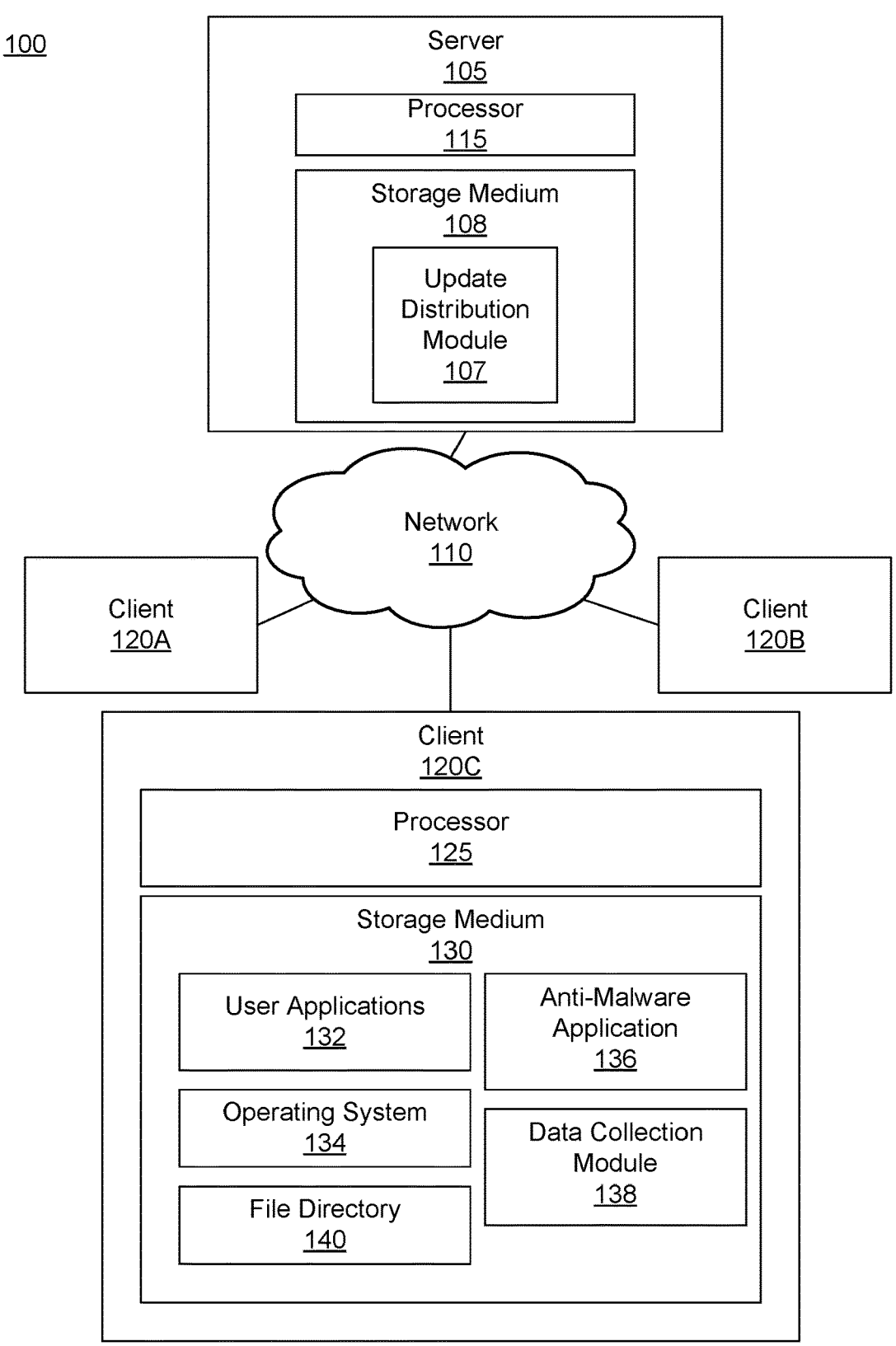
FIG. 1 is a system diagram illustrating an example embodiment of a computing environment including clients, a server, and a network.

FIG. 1 is a system diagram illustrating an example embodiment of a system environment 100 comprising a server 105, a network 110, and clients 120A, 120B and 120C, which are collectively referenced herein as clients 120. For simplicity and clarity, only one server 105 and a limited number of clients 120 are shown. However, other embodiments may include different numbers of servers 105 and clients 120. The system environment 100 may also include different or additional entities.

The network 110 represents the communication pathways between the server 105 and clients 120. In one embodiment, the network 110 is the Internet. The network 110 may also utilize dedicated or private communications links that are not necessarily part of the Internet such as local area networks (LAN). In one embodiment, the network 110 uses standard communications technologies and/or protocols.

Each client 120 comprises one or more computing devices capable of processing data as well as transmitting and receiving data via the network 110. For example, a client device 120 may be a desktop computer, a laptop computer, a smart phone, a tablet computing device, an Internet of Things (IoT) device, or any other device having computing and data communication capabilities. Each client 120 includes a processor 125 for manipulating and processing data, and a storage medium 130 for storing data and program instructions associated with various applications. The storage medium 130 may include both volatile memory (e.g., random access memory) and non-volatile storage memory such as hard disks, flash memory, flash drives, external memory storage devices, USB drives, and the like. In addition to storing program instructions, the storage medium 130 stores various data associated with operation of the client device 120.

In one embodiment, the storage medium 130 comprises a non-transitory computer-readable storage medium that stores a file directory 140 and various executable programs including an operating system 134, anti-malware application 136, user applications 132, and a data collection module 138 that are each embodied as computer-executable instructions stored to the non-transitory computer-readable storage medium. The instructions, when executed by the processor 125, cause the clients 120 to perform the functions attributed to the programs described herein.

The operating system 134 is a specialized program that manages computer hardware resources of the clients 120 and provides common services to the user applications 132. For example, a computer's operating system 134 may manage the processor 125, storage medium 130, or other components not illustrated such as a graphics adapter, an audio adapter, network connections, disc drives, and USB slots. A cell phone's operating system 134 may manage the processor 125, storage medium 130, display screen, keypad, dialer, wireless network connections and the like. Because many programs and executing processes compete for the limited resources provided by the processor 125, the operating system 134 may manage the processor bandwidth and timing to each requesting process. Examples of operating systems 134 include WINDOWS, MAC OS, IOS, LINUX, UBUNTU, UNIX, and ANDROID.

The user applications 132 may include applications for performing a particular set of functions, tasks, or activities for the benefit of the user. Examples of user applications 132 may include a word processor, a spreadsheet application, and a web browser. In some cases, a user application 132 may be a source of malware that is unknowingly hidden in the user application 132. The malware may infect the client 120 when the user application 132 is installed or executed.

The file directory 140 stores files. Files may include system files associated with operation of the operating system 134, the user applications 132, or the anti-malware application 136. The files may further include user files that may be created or modified by users. Examples of user files may include image files, video files, word processor documents, spreadsheet documents, and drawing files.

An anti-malware application 136 detects, stops, and removes malware. The anti-malware application 136 may prevent new malware from being installed on a client 120 or remove or disable existing malware that is already present on the client 120. The anti-malware application 136 may determine if a process is malware based on behaviors indicative of malware, based on static analysis of a file, based on emulation of a program using a sandbox, based on blacklist or whitelists, or based on a combination of factors. In one embodiment, the anti-malware application 136 may store and/or download from the network 110, malware definitions that specify characteristics or behaviors of malware that the anti-malware application 136 seeks to detect. For example, the malware definition may specific a particular snippet of code, header information, a file hash, a behavior heuristic, or combination thereof that is indicative of a specific known malware of class of malware. The anti-malware application 136 may furthermore maintain a whitelist of trusted files, which may similarly be identified based on various characteristics (e.g., a goodware definition), and which will not be identified as malware by the anti-malware application. Malware definition updates may be sent to different clients 120 at different times. For example, as described in further detail below, a subset of clients 120 may be selected to test new malware definitions prior to other clients 120 receiving the updates.

The anti-malware application 136 may perform scans on a directory of files at scheduled intervals or may operate to scan files just before they are accessed. In response to detecting malware, the anti-malware application 136 may temporarily block the malware from executing and may generate a notification in a user interface of the client 120 to alert the user that the identified file may be malware. The anti-malware application 136 may recommend quarantining the identified file but may also give the user the option to decline the quarantine. For example, users with specialized knowledge, such as IT professionals, may be able to identify that the file can in fact be trusted and that the detection was a false positive. In either case, the anti-malware application 136 may store data recording the file that was detected as malware, the malware definition that invoked the detection, and the user's selection of whether or not to quarantine the file in response to the detection. The data may also be sent to the server 105 for further analysis, as will be described in further detail below.

A data collection module 138 collects general data relating to the client 120, such as configuration and behavior data associated with client 120 relevant to selecting clients 120 for testing an update to the malware definitions applied by the anti-malware application 136. For example, the data collection module 138 may collect information such as hardware configuration, operating system, software configuration, software versions (including a version of the anti-malware application 136), and geographical locations of the client device 120. The data collection module 138 may also collect data associated with downloads of malware definition updates and general usage of user applications 132. For example, the data collection module 138 may collect data such as if and when a client 120 downloads an update after a user notification is provided indicating that the update is available for download.

The data collection module 138 may also collect usage information associated with how a user interacts with a client 120. Information such as which hours in the day and which days a user most actively uses a client device may be collected.

In an embodiment, the data collection module 138 provides a user of the client 120 with an option to opt into or opt out of the data collection associated with testing of updates. In the user opts out, then the client and user-specific data not necessary for operation of the anti-malware application 136 is not collected or sent to the server 105. If the user opts in, the collected data may be used to enable possible participation in receiving and testing of new updates. For example, a user may indicate that s/he is willing to test new updates and consents to the data collection module 138 collecting relevant information and sending it back to the server 105 to benefit the testing process.

The server 105 is a computer system configured to store, receive, and transmit data to client devices 120 via the network 110. The server 105 may include a singular computing system, such as a single computer, or a network of computing systems, such as a data center or a distributed computing system. In one embodiment, the server 105 includes a processor 115 for manipulating and processing data, and a storage medium 108 for storing data and program instructions associated with various applications. The storage medium 108 may include both volatile memory (e.g., random access memory) and non-volatile storage memory such as hard disks, flash memory, flash drives, external memory storage devices, USB drives, and the like. The server 105 may receive data from the clients 120 and may also send data to the clients.

The storage medium 108 includes an update distribution module 107. The update distribution module 107 releases updates for malware definitions to client devices 120 in a controlled fashion by first providing an update of malware definition to a cohort of target devices for testing the update, where the cohort of target devices are selected based on telemetry data collected by the data collection module 138. Based on the test results, the update distribution module 107 makes a decision whether to distribute the update outside of the cohort of target client devices or to roll back the update provided to the cohort. The update distribution module 107 is discussed in further detail in FIG. 2 below.

Figure 2:
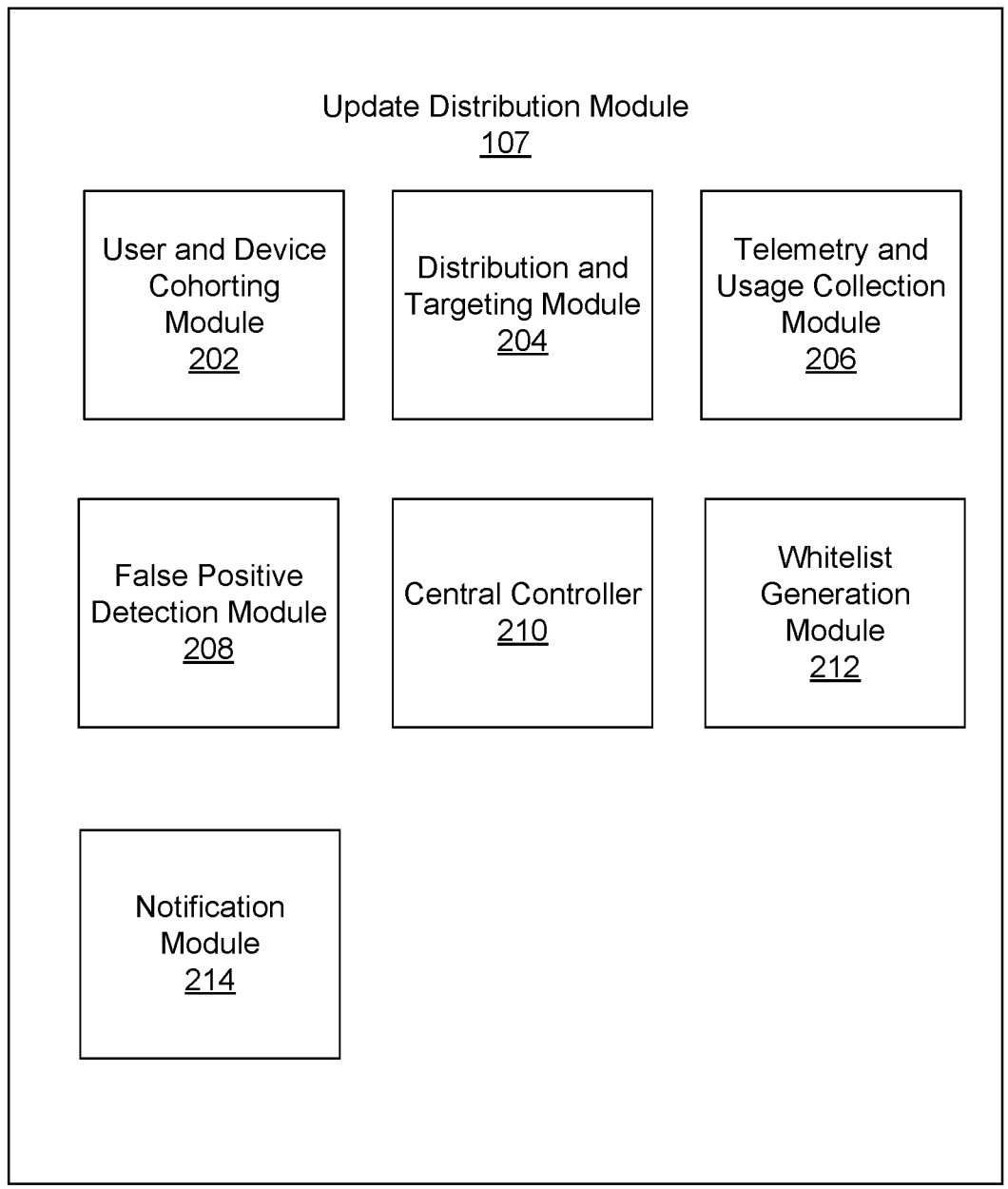
FIG. 2 is a block diagram illustrating an example embodiment of an update distribution module of the server.

FIG. 2 illustrates an example embodiment of update distribution module 107 of the server 105. The update distribution module 107 includes a user and device cohorting module 202, a distribution and targeting module 204, a telemetry and usage collection module 206, a false positive detection module 208, a central controller 210, a whitelist generation module 212, and a notification module 214. Alternative embodiments may include different or additional modules or omit one or more of the illustrated modules.

The user and device cohorting module 202 identifies and selects a list of target devices (i.e., a cohort) 120 to receive and test an initial release of an update in malware definitions. The target devices are selected based on a set of parameters relating to devices, users, or both collected from the data collection module 138. The user and device cohorting module 202 may furthermore derive additional metrics from the received parameters that may be used for cohort selection. For example, the user and device cohorting module 202 may predict a likelihood of the user downloading the update and predict an activity level of the client device 120 in a stipulated time slot. Here, a prediction of the user's activity level may be based on the local time in the location of the client 120 when the update is scheduled for publication and historical activity levels during different time periods. For example, if a new update is published at 9 AM, Pacific Time, the user and device cohorting module 202 may predict higher activity level in the U.S. and western Europe than in parts of Asia. As another example, user and device cohorting module 202 may predict activity level based on user-specific data (e.g., by observing that a particular user spends little time on a client device during weekdays).

The user and device cohorting module 202 may further identify the list of target devices based on configuration information (e.g. hardware configuration, operating system, software configuration, software versions, etc.) associated with client devices 120. Depending on different updates in malware definitions, the user and device cohorting module 202 may select clients 120 that span a range of different configurations to achieve diversity between the clients 120 and increase the likelihood of detecting various false positives that may be specific to one configuration. In some embodiments, if the updates are specific to certain configurations (e.g. Windows vs. MacOS, a specific version of a software or OS, etc.), the user and device cohorting module 202 may instead select target devices limited to certain specific configurations.

The distribution and targeting module 204 receives the list of target devices 120 in the selected cohort and distributes the updates to the selected cohort of clients 120. In one embodiment, the distribution and targeting module 204 initiates the updates by sending push messages to the selected target devices. The push messages notify users that a new update in malware definitions is available for download, and enables the user to initiate the update. In other embodiments, the distribution and targeting module 204 causes the target clients 120 to automatically download and install the update without necessarily requiring user input.

The telemetry and usage collection module 206 obtains and aggregates real-time download, usage and behavior data from the clients 120 in the cohort. The data may include information such as if and when a target client device downloads and installs the update and detection results relating to malware definitions in the update useful for identifying false positives. For example, if an updated malware definition triggers a detection, the telemetry and usage collection module 206 may obtain a report indicating the specific malware definition that triggered the update, the file or set of files that matched the definition, and a user's decision of whether or not to quarantine the identified files.

The false positive detection module 208 identify patterns of false positive detection based on data received from the telemetry and usage collection module 206. The false positive detection module 208 may detect a potential false positive in response to a pattern of detections (e.g., over a threshold number) associated with a particular malware definition in which the user declined to quarantine the identified file and indicated that the file is trusted. Alternatively, the false positive detection module 208 may identify a potential false positive in response to an abnormally large number of detection (e.g., over a threshold) regardless of the user response to the quarantine decision. In further embodiments, potential false positive detections may be identified based on a combination of factors. In an embodiment, potential false positives may be sent to either an automated analysis system or manual analysis system (e.g., a human researcher) to confirm whether the malware definition was triggering false positives.

The central controller 210 monitors the use and device cohorting module 202, the distribution and targeting module 204, the telemetry and usage collection module 206, and the false positive detection module 208, and makes decisions relating to distribution of updated malware definitions.

The central controller 210 monitors download and usage goals associated with the update to determine whether the initial cohort is of sufficient size to achieve a statistically meaningful level of data for the central controller 210 to reach a conclusion about whether or not the updated malware is triggering false positives. For example, based on the data collected by the telemetry and usage collections module 206, the central controller 210 may determine that the number of downloads, uses, or responses from users does not reach a threshold number, and therefore expanding the cohort may be desirable. In this case, the central controller 210 may notify the use and device cohorting module 202 to identify additional target devices to add to the cohort.

Once enough data is obtained, the central controller 210 determines whether to roll back an update or to distribute the update more widely to devices outside the cohort of target devices. If the false positive detection module 208 identified that the update to a malware definition triggered false positives at above a threshold rate, the central controller 210 may send instructions to the target devices that roll back the updated malware definition. Here, the malware definition may then be refined to avoid triggering the false positive and re-tested. On the other hand, if the false positive detection module 208 indicates a sufficiently low rate of false positives associated with the update, the central controller 210 may make a decision to distribute the update more widely to devices outside the cohort of target devices. The central controller 210 may send instructions for mass distribution of the update to the notification module 214 as described below.

The whitelist generation module 212 generates a whitelist containing a list of trusted files. The whitelist generation module 212 may obtain information from the central controller 210 associated with false positives, and in some instances, may add a file determined to be trusted to the whitelist. The whitelist generation module 212 sends the whitelist to the notification module 214 for distribution to clients 120.

The notification module 214 manages sending of notifications to clients 120. For example, the notification module 214 facilitates sending of malware definition updates (or rollbacks), whitelist updates, or other information to the clients 120.

Figure 3:
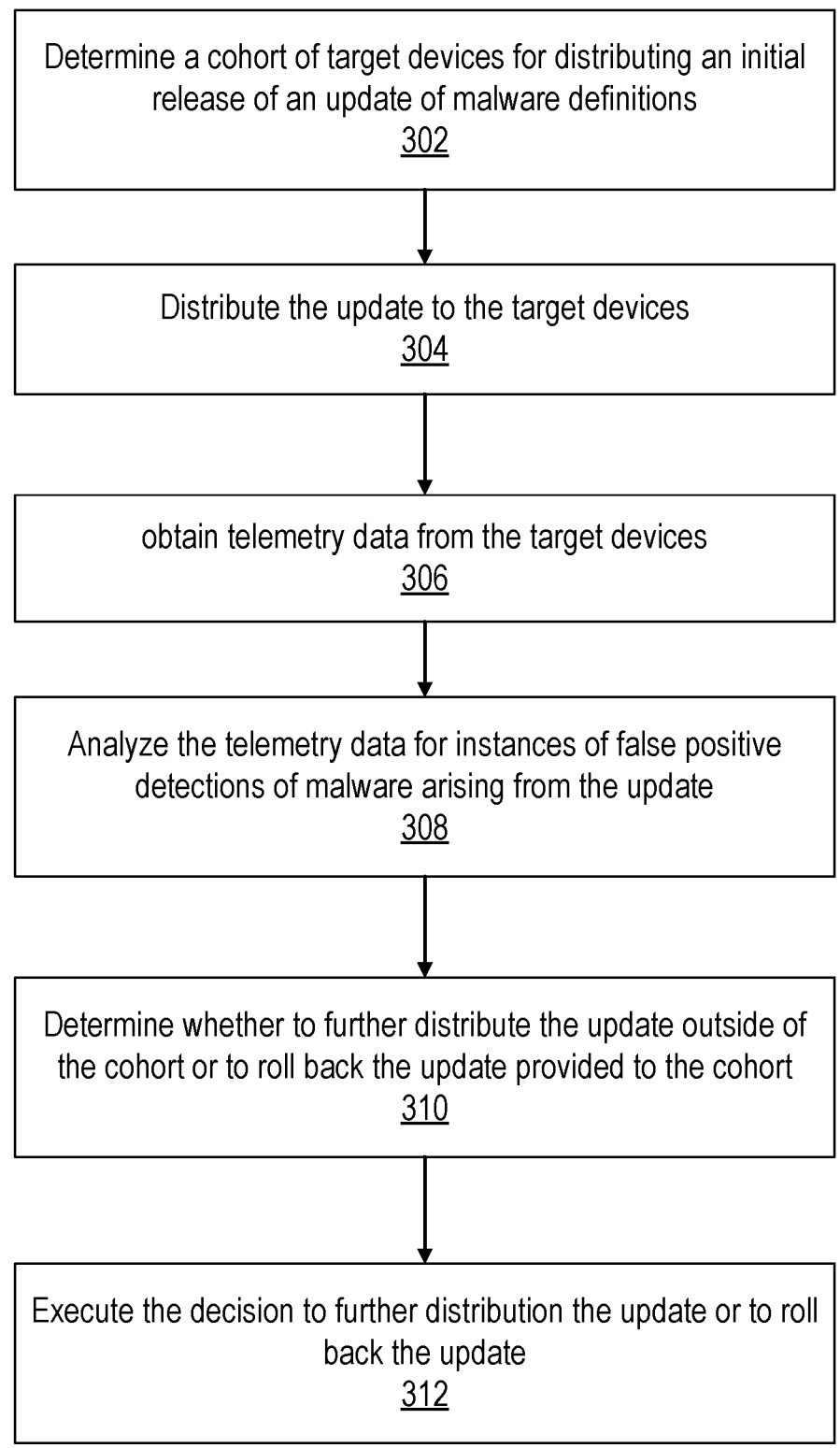
FIG. 3 is a flowchart illustrating an embodiment of a process for controlling distribution of malware definition updates.

FIG. 3 is a flowchart illustrating an embodiment of a process for determining whether an update in malware definition triggers false positive detections. The user and device cohorting module 202 determines 302 a cohort of target devices for an initial release of an update in malware definitions based on a set of parameters relating to both devices and users. The identified target devices are selected based on their likelihood of generating sufficient usage data relevant to detecting false positives within a predetermined time frame. The distribution and targeting module 204 distributes 304 the new update to the target devices. The telemetry and usage collection module 206 obtains 306 telemetry data including usage data associated with the update indicative of detections and user actions in response to the detections. The false positive detection module 208 analyzes 308 the telemetry data for instances of false positive detections of malware arising from the update. Based on the analysis, the central controller 210 determines 310 whether to further distribute the update outside of the cohort or to roll back the update provided to the cohort of target devices. The update distribution module 107 executes 312 the decision to further distribute or roll back the update.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

The invention claimed is:

1. A method for preventing false positive detection of malware for a plurality of devices comprising:
   determining usage likelihoods for the plurality of devices, the usage likelihoods including, for each of at least some of the plurality of devices, a likelihood that an update will be installed and that a predefined usage level will be achieved in a predetermined period of time after the update is sent to the device;
   determining, based on the usage likelihoods, a cohort of target devices of the plurality of devices for distributing an initial release of an update of malware definitions;
   sending the update to the cohort of target devices;
   obtaining telemetry data from the cohort of target devices, the telemetry data including information associated with usage of the cohort of target devices following the update;
   analyzing the telemetry data for instances of false positive detections of malware arising from the update to the malware definitions;
   determining, based on the analyzing of the telemetry data, a decision of whether to further distribute the update to other devices in the plurality of devices that are not in the cohort of target devices or to roll back the update provided to the cohort of target devices; and
   executing the decision to further distribute the update or to roll back the update.

2. The method of claim 1, wherein determining the cohort of target devices is further based on a set of parameters associated with the plurality of devices and users of the target devices, the set of parameters including one or more of the following: hardware configuration, operating systems, software configuration, and versions of software.

3. The method of claim 1, wherein the likelihood for a given device is determined based on one or more of the following: geographical information associated with a user of the given device or usage history of the given device.

4. The method of claim 1 further comprising:
   determining that the update triggers a false positive detection of malware;
   adding a file associated with the update to a whitelist that contains a list of files identified as trusted; and
   sending the whitelist to one or more devices outside the cohort of target devices before sending the update to the one or more devices.

5. The method of claim 1 further comprising:
   responsive to determining, based on the telemetry data, that a download goal or a usage threshold is not achieved;
   identifying additional target devices outside the cohort of target devices; and
   sending notifications including the update to the additional target devices.

6. The method of claim 1, wherein determining the decision of whether to further distribute the update to other devices in the plurality of devices that are not in the cohort of target devices or to roll back the update provided to the cohort of target devices is based on a number of responses received from the cohort of target devices, the responses indicating if a target device quarantines or un-quarantines a file identified as untrusted by the update.

7. A non-transitory computer readable storage medium storing instructions for preventing false positive detection in malware for a plurality of devices, the instructions when executed by one or more processors causing the one or more processors to perform steps comprising:
   determining usage likelihoods for the plurality of devices, the usage likelihoods including, for each of at least some of the plurality of devices, a likelihood that an update will be installed and that a predefined usage level will be achieved in a predetermined period of time after the update is sent to the device;
   determining, based on the usage likelihoods, a cohort of target devices of the plurality of devices for distributing an initial release of an update of malware definitions;
   sending the update to the cohort of target devices;
   obtaining telemetry data from the cohort of target devices, the telemetry data including information associated with usage of the cohort of target devices following the update;
   analyzing the telemetry data for instances of false positive detections of malware arising from the update to the malware definitions;
   determining, based on the analyzing of the telemetry data, a decision of whether to further distribute the update to other devices in the plurality of devices that are not in the cohort of target devices or to roll back the update provided to the cohort of target devices; and
   executing the decision to further distribute the update or to roll back the update.

8. The non-transitory computer readable storage medium of claim 7, wherein determining the cohort of target devices is further based on a set of parameters associated with the plurality of devices and users of the target devices, the set of parameters including one or more of the following: hardware configuration, operating systems, software configuration, and versions of software.

9. The non-transitory computer readable storage medium of claim 7, wherein the likelihood for a given device is determined based on one or more of the following: geographical information associated with a user of the given device or usage history of the given device.

10. The non-transitory computer readable storage medium of claim 7, wherein the steps further comprising:
    determining that the update triggers a false positive detection of malware;
    adding a file associated with the update to a whitelist that contains a list of files identified as trusted; and
    sending the whitelist to one or more devices outside the cohort of target devices before sending the update to the one or more devices.

11. The non-transitory computer readable storage medium of claim 7, wherein the steps further comprising:
    responsive to determining, based on the telemetry data, that a download goal or a usage threshold is not achieved;
    identifying additional target devices outside the cohort of target devices; and
    sending notifications including the update to the additional target devices.

12. The non-transitory computer readable storage medium of claim 7, wherein determining the decision of whether to further distribute the update to other devices in the plurality of devices that are not in the cohort of target devices or to roll back the update provided to the cohort of target devices is based on a number of responses received from the cohort of target devices, the responses indicating if a target device quarantines or un-quarantines a file identified as untrusted by the update.

13. A computer system comprising:
    one or more processors; and
    a non-transitory computer readable storage medium storing instructions for preventing false positive detection of malware for a plurality of devices, the instructions when executed by one or more processors causing the one or more processors to perform steps comprising:
       determining usage likelihoods for the plurality of devices, the usage likelihoods including, for each of at least some of the plurality of devices, a likelihood that an update will be installed and that a predefined usage level will be achieved in a predetermined period of time after the update is sent to the device;
       determining, based on the usage likelihoods, a cohort of target devices of the plurality of devices for distributing an initial release of an update of malware definitions;
       sending the update to the cohort of target devices;
       obtaining telemetry data from the cohort of target devices, the telemetry data including information associated with usage of the cohort of target devices following the update;
       analyzing the telemetry data for instances of false positive detections of malware arising from the update to the malware definitions;
       determining, based on the analyzing of the telemetry data, a decision of whether to further distribute the update to other devices in the plurality of devices that are not in the cohort of target devices or to roll back the update provided to the cohort of target devices; and
       executing the decision to further distribute the update or to roll back the update.

14. The computer system of claim 13, wherein determining the cohort of target devices is further based on a set of parameters associated with the plurality of devices and users of the target devices, the set of parameters including one or more of the following: hardware configuration, operating systems, software configuration, and versions of software.

15. The computer system of claim 13, wherein the likelihood for a given device is determined based on one or more of the following: geographical information associated with a user of the given device or usage history of the given device.

16. The computer system of claim 13, wherein the steps further comprising:
    responsive to determining, based on the telemetry data, that a download goal or a usage threshold is not achieved;
    identifying additional target devices outside the cohort of target devices; and
    sending notifications including the update to the additional target devices.

17. The computer system of claim 13, wherein the steps further comprising:
    determining that the update triggers a false positive detection of malware;
    adding a file associated with the update to a whitelist that contains a list of files identified as trusted; and
    sending the whitelist to one or more devices outside the cohort of target devices before sending the update to the one or more devices.

* * * * *